United States Patent [19]

Makizuka et al.

[11] 4,392,205
[45] Jul. 5, 1983

[54] ELECTRONIC DATA CONTROL IN A NUMBERING MACHINE

[75] Inventors: Takakazu Makizuka, Nara; Sunao Katoh, Yamatokoriyama, both of Japan

[73] Assignee: Sharp Kabushiki Kaisha, Osaka, Japan

[21] Appl. No.: 227,986

[22] Filed: Jan. 23, 1981

[30] Foreign Application Priority Data

| Jan. 24, 1980 | [JP] | Japan | 55-7933 |
| Jan. 31, 1980 | [JP] | Japan | 55-11823 |
| Feb. 6, 1980 | [JP] | Japan | 55-13892 |
| Feb. 6, 1980 | [JP] | Japan | 55-13893 |
| Feb. 6, 1980 | [JP] | Japan | 55-13894 |

[51] Int. Cl.$^3$ .............................................. G06F 3/12
[52] U.S. Cl. ................................... 364/518; 364/710; 235/60 P
[58] Field of Search ................... 364/518, 519, 710; 235/58 P, 60 P

[56] References Cited

U.S. PATENT DOCUMENTS

| 3,643,077 | 2/1972 | Griggs, Jr. et al. | 364/710 X |
| 3,855,461 | 12/1974 | Stockwell | 364/710 |
| 3,858,799 | 1/1975 | Yoshio et al. | 364/170 X |
| 4,044,228 | 8/1977 | Kishimoto et al. | 364/710 |
| 4,106,101 | 8/1978 | Harrison | 364/710 X |
| 4,142,235 | 2/1979 | Tadakuma et al. | 235/60 P X |
| 4,187,547 | 2/1980 | Olander et al. | 364/710 |
| 4,203,152 | 5/1980 | Watson et al. | 364/710 X |
| 4,237,541 | 12/1980 | Mikada | 364/710 |

*Primary Examiner*—Edward J. Wise
*Attorney, Agent, or Firm*—Birch, Stewart, Kolasch and Birch

[57] ABSTRACT

A numbering machine includes a digital data control system for varying the print data. A keyboard panel is provided for introducing a desired initial number from which the numbering operation should begin. A desired skip number is introduced through the keyboard panel to set the numerical gap between successively printed numbers so as to perform the numbering operation, for example, 2, 4, 6, 8, 10, .... The digital data control system can also perform a subtraction operation. Further, the number of times of the same data is printed may be preset to perform the numbering operation, for example, 1, 1, 1, 2, 2, 2, 3, 3, 3, .... These functions can be combined to perform a wide variety of numbering functions and sequences.

15 Claims, 12 Drawing Figures

ELECTRONIC DATA CONTROL IN A NUMBERING MACHINE

BACKGROUND AND SUMMARY OF THE INVENTION

The present invention relates to an electronic data control system in a numbering machine.

A conventional mechanical numbering machine performs only a few preselected operations. Moreover, the setting operation is not easy in the conventional mechanical numbering machine.

Accordingly, an object of the present invention is to provide an electronic data control system in a numbering machine.

Another object of the present invention is to increase the variety of operations performed by a numbering machine.

Still another object of the present invention is to simplify the setting operation for selecting a desired operation mode in a numbering machine.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a digital memory is employed in an electronic data control system of a numbering machine, the contents of which are varied by a preselected number upon completion of each printing operation. A keyboard panel including numeral keys and function keys is associated with a control circuit for determining the preselected number to be changed upon every completed printing operation.

In a preferred form, a print time instruction key is included in the function keys for preselecting the number of times for printing the same number. Further, an initial number setting key is included in the function keys for introducing a desired number into the digital memory from which the numbering operation should begin.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 6, 6(A) and 6(B) are a detailed block diagram of an essential part of the electronic data control system of FIG. 5; and FIGS. 7, 7(A), 7(B), 8, 9 and 10 are flow charts for explaining an operation mode of the electronic data control system of FIGS. 5 and 6.

DESCRIPTION OF THE PREFERRED EMBODIMENTS

Figure 1:
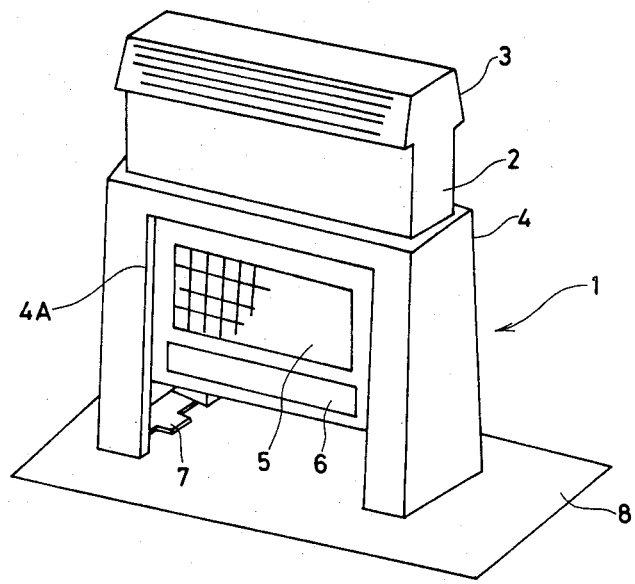
FIG. 1 is a perspective view of an embodiment of a numbering machine of the present invention.

A numbering machine 1 of the present invention comprises a housing 4 and a depressing member 2 slidably secured by the housing 4. A depression grip 3 is formed on the upper end of the depressing member 2 for facilitating the depression of the depressing member 2 toward a recording paper 8. A mechanical printer unit is disposed near the bottom end of the depressing member 2 for conducting a printing operation onto the recording paper 8 when the depressing member 2 is depressed downwardly. A keyboard panel 5 and a digital display unit 6 are disposed on the front wall of the depressing member 2, which are placed at a cut-out portion 4A of the housing 4. An indicator 7 is secured to the housing 4 for indicating the print position.

Figure 2:
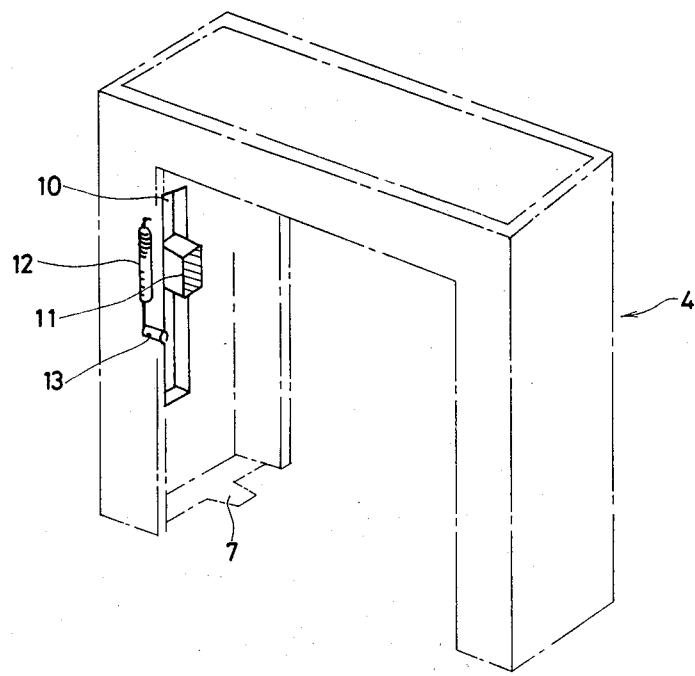
FIG. 2 is a perspective view of a housing of the numbering machine of FIG. 1.

FIG. 2 shows the housing 4. Grooves 10 are formed in the side walls of the housing 4, in which protrusions 11 formed on the side walls of the depressing member 2 are slidably accomodated. Other protrusions 13 are formed on the side walls of the depressing member 2, which are connected to the housing 4 via springs 12 for biasing the depressing member 2 upward, thereby holding the depressing member 2 at an upper initial position when the depressing force is removed.

Figure 3:
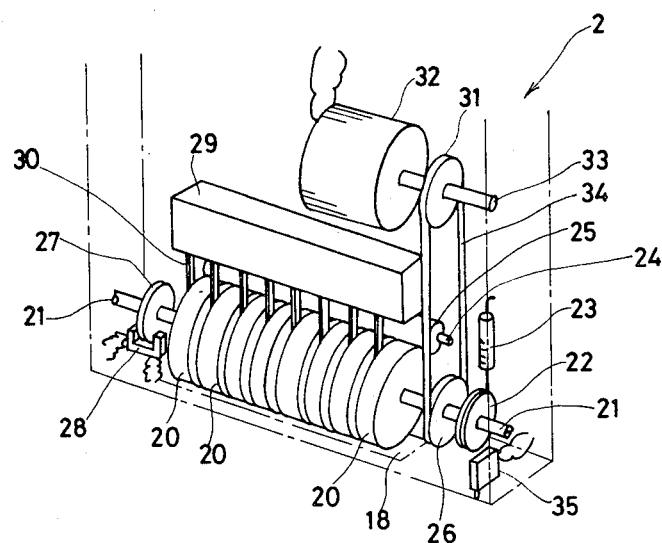
FIG. 3 is a perspective view of a mechanical printer unit included in the numbering machine of FIG. 1.

FIG. 3 shows the mechanical printer unit disposed in the depressing member 2. An aperture 18 is formed in the bottom wall of the depressing member 2 to expose print wheels 20. Each of the print wheels 20 (for example, eight digits) is rotatably supported by a shaft 21 via a coupling member. A print wheel selection lever 30 is associated with each print wheel 20 to hold the print wheel 20 at a desired rotation angle. The type selection operation is well known in the art and, therefore, the detailed description thereof is omitted for the purpose of simplicity. The print wheel selection lever 30 is controlled by a plunger disposed in a solenoid block 29. A pulley 26 is secured to the shaft 21. The pulley 26 is connected to a drive pulley 31, which is fixed to a drive shaft of a pulse motor 32, through a timing belt 34. Another pulley 22 is secured to the shaft 21 to reset the print wheel selection levers 30 and hold the print wheels 20 at the initial position when the printing operation is completed. More specifically, a spring 23 is wound around the pulley 22, and the other end of the spring 23 is fixed to the housing 4 to rotate the shaft 21 in the counter direction to the drive direction of the pulse motor 32. A timing plate 27 is secured to the shaft 21 for developing a type position signal in cooperation with a detection block 28. An ink roller 25 is rotatably supported by a shaft 24 to ink the type supported by the print wheels 20. A microswitch 35 is disposed at the bottom end of the depressing member 2 so that the microswitch 35 is closed when the depressing member 2 is depressed against the recording paper 8.

Figure 4:
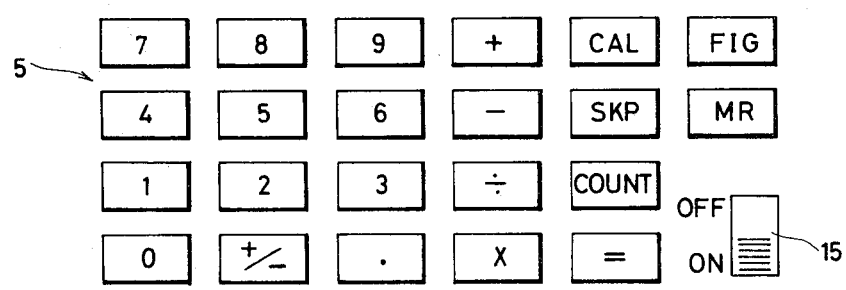
FIG. 4 is a plan view of a keyboard panel included in the numbering machine of FIG. 1.

FIG. 4 shows the keyboard panel 5. The keyboard panel 5 includes numeral keys 0 through 9, calculator operation keys $+$, $-$, $\div$ and $\times$, a decimal point key ·, an equal key $=$ for indicating the completion of each function, a sign selection key $+/-$, and function keys CAL, SKP, COUNT, FIG and MR. The minus key $-$ instructs the device to perform subtraction in the calculator mode, and functions as a hyphen indicator in the numbering mode, thereby enabling the device to print, for example, 54-001, 54-002, 54-003, . . . .

The skip key SKP functions to preset a skip number in the numbering operation. For example, when the skip key SKP, the numeral key 1, and the equal key = are actuated in this order, the numbering operation of 1, 2, 3, 4, . . . is performed. When the skip key SKP, the numeral key 2, and the equal key = are actuated in this order, the numering operation of 2, 4, 6, 8, . . . is performed. If the number "0" is preset through the use of the skip key SKP, the same number of data is sequentially printed out.

The count key COUNT functions to preset the number or times that the device should print the same data. When, for example, the count key COUNT, the numeral key 2, and the equal key = are actuated in this order, the numering operation of 1, 1, 2, 2, 3, 3, . . . is performed.

The equal key = is used to preset the initial number from which the numbering operation is performed. When, for example, the numbering operation is desired to start from "101", the numeral keys 1, 0 and 1, and the equal key = are actuated in this order.

The figure key FIG functions to select the number of digits for the printed data. When, for example, the figure key FIG, the numeral key 4, and the equal key = are actuated in this order, the numbering operation is performed between the data "0001" and "9999".

The memory recall key MR is used to read out the last data of the last numbering operation. The last numbering data is stored in a nonvolatile memory even when a main power supply switch 15 is switched off. Accordingly, the numbering operation of the sequential data can be performed intermittently, pausing and resuming at a later time.

The sign selection key +/− is actuated after actuation of the skip key SKP if a decreasing numbering operation is required. The mode selection key CAL is used to select the operation mode between the calculator operation and the numbering operation.

Figure 5:
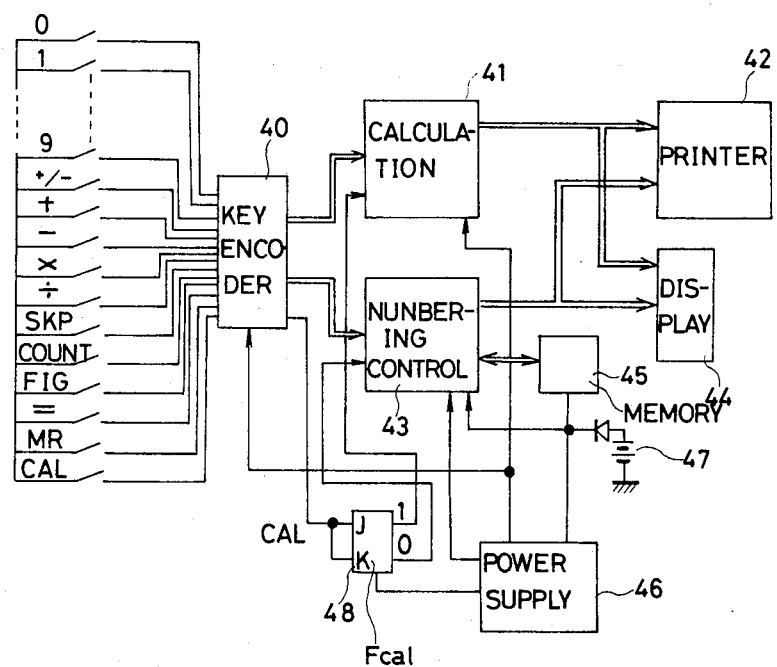
FIG. 5 is a schematic block diagram of an embodiment of an electronic data control system included in the numbering machine of FIG. 1.
Figure 6A:
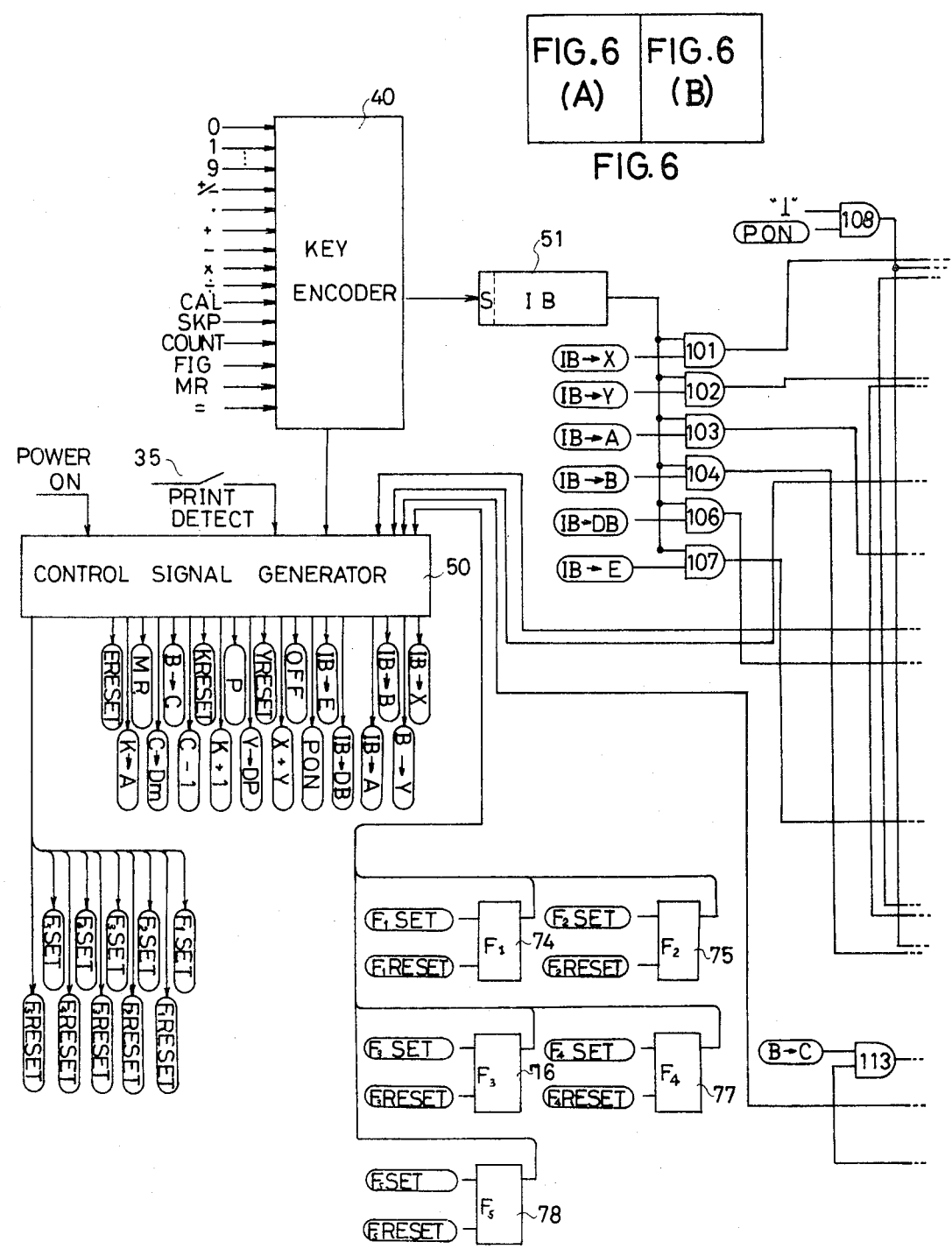
Figure 6B:
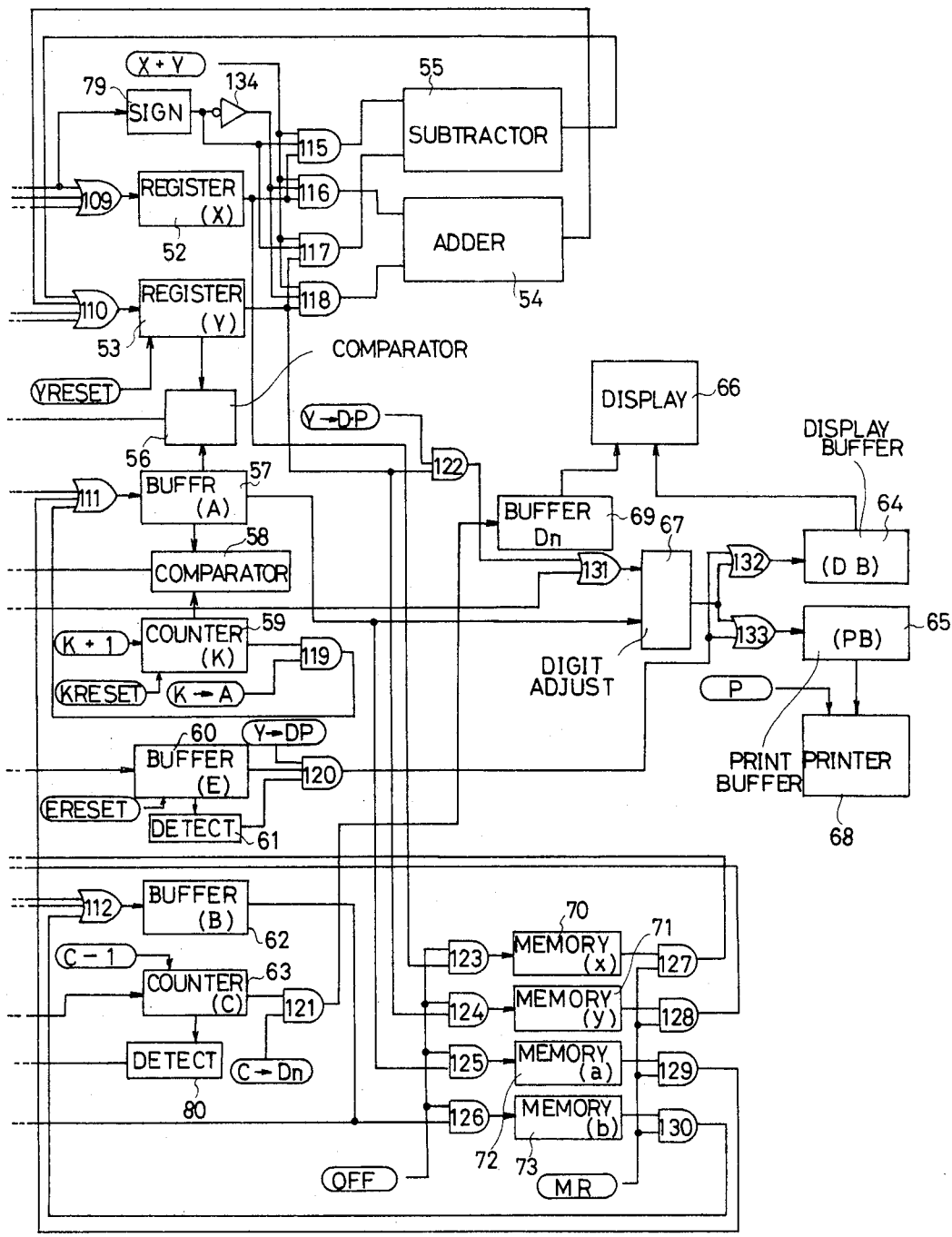

FIG. 5 schematically shows an embodiment of an electronic data control system included in the numbering machine of the present invention. The data control system comprises a key encoder 40 and an arithmetic calculation control circuit 41 for performing the arithmetic calculation in the calculator mode. The calculation result is applied to a printer unit 42 (shown in FIG. 3) and a display unit 44 (the digital display unit 6 in FIG. 1). The data control system further comprises a numbering control circuit 43 for performing the numbering operation. The numbering data derived from the numbering control circuit 43 is applied to the printer unit 42 and the display unit 44. A nonvolatile memory 45 is connected to the numbering control circuit 43 to store the numbering data. The numbering control circuit 43 and the nonvolatile memory 45 are connected to a secondary battery 47, thereby receiving the power supply therefrom when the main power supply is terminated. A power supply circuit 46 functions to supply power to the data control system, and is controlled by the main power supply switch 15.

A flip-flop ($F_{cal}$) 48 is associated with the mode selection key CAL for selecting the operation mode of the data control system. When the mode selection key CAL is actuated, the flip flop ($F_{cal}$) 48 is set, and the set output of the flip-flop 48 is applied to the arithmetic calculation control circuit 41 to enable it. Under these conditions, when the mode selection CAL is again actuated, the flip flop ($F_{cal}$) 48 is reset, and the reset output thereof is applied to the numbering control circuit 43 for enabling it. The flip-flop ($F_{cal}$) 48 is automatically reset upon throwing of the main power supply to initially place the machine in the numbering mode.

The arithmetic calculation operation is well known in the art and, therefore, the detailed description thereof is omitted for the purpose of simplicity. The numbering operation will be described in detail with reference to FIGS. 6 through 10.

When any one of the function keys included in the keyboard panel 5 is actuated, the key encoder 40 develops a corresponding key code signal toward a control signal generator 50. When any one of the numeral keys included in the keyboard panel 5 is actuated, the key encoder 40 develops a corresponding numeral data toward an input buffer circuit (IB) 51. The control signal generator 50 includes a read only memory (ROM) for developing various control signals required for performing the numbering operation shown in FIGS. 7 through 10. The control signal generator 50 is connected to receive a print completion signal derived from the microswitch 35 (see FIG. 3). The control signal generator 50 is further connected to receive detection outputs derived from comparators 56 and 58, a print time number detection signal derived from a detection circuit 80, an ON/OFF indication signal derived from the power supply circuit 46 (see FIG. 5), and condition indicating signals derived from flip-flops ($F_1$, $F_2$, $F_3$, $F_4$ and $F_5$) 74, 75, 76, 77 and 78 for developing various control signals.

The input buffer circuit (IB) 51 temporarily stores the coded numeral information applied from the numeral keys via the key encoder 40. The input buffer circuit (IB) 51 includes a sign bit S for storing the sign information in response to the actuation of the sign selection +/−. The numeral information stored in the input buffer circuit (IB) 51 is developed through any one of AND gates 101, 102, 103, 104, 106 and 107, which are controlled by the control signals developed from the control signal generator 50.

The skip number preset by the skip key SKP is introduced into an X register 52 via an OR gate 109 and the AND gate 101 which is made conductive by the control signal (IB→X) which is developed from the control signal generator 50 when the skip key SKP is actuated. That is, the X register 52 stores the skip number information applied from the input buffer circuit (IB) 51. An AND gate 108 is made conductive by the control signal $P_{ON}$ which is developed upon throwing of the main power supply, thereby introducing the initial data "1" into the X register 52 through the AND gate 108 and the OR gate 109. An output data of the X register 52 is applied to one input terminal of an adder 54 through an AND gate 116, and to one input terminal of a subtractor 55 through an AND gate 115.

The present numbering data is stored in a Y register 53. The Y register 53 is initially reset to zero by the control signal (Y Reset) which is developed upon throwing of the main power supply. When the desired initial data is introduced through the keyboard panel into the input buffer circuit (IB) 51, and the equal key = is subsequently actuated, the control signal (IB→Y) is developed from the control signal generator 50 to make conductive the AND gate 102, thereby introducing the initial data into the Y register 53 via the AND gate 102 and an OR gate 110 to preset the initial number. An output data of the Y register 53 is applied to the other input terminal of the adder 54 through an AND gate 118, and to the other input terminal of the subtractor 55 through an AND gate 117. Moreover, the output data of the Y register 53 is applied to a digit adjust circuit 67 through an AND gate 122 and an OR gate 131 in response to the control signal $\overline{Y \rightarrow D.P}$, and to one input terminal of the comparator 56.

The sign information stored in the sign bit S of the input buffer circuit (IB) 51 is applied to a sign memory 79 at a time when the skip number information is introduced from the input buffer circuit (IB) 51 to the X register 52 in response to the control signal $\overline{IB \rightarrow X}$. The sign memory 79 is set when the minus sign is applied thereto. When the sign memory 79 is set, the AND gates 115 and 117 are made conductive in response to the control signal $\overline{X+Y}$, thereby activating the subtractor 55 to reduce the contents stored in the Y register 53 by the contents stored in the X register 52. The subtraction result is applied to the Y register 53 through the OR gate 110. When the sign memory 79 is reset, the AND gates 116 and 118 are made conductive via an inverter 134 in response to the control signal $\overline{X+Y}$, thereby applying the contents stored in the X and Y registers 52 and 53 to the adder 54. The addition result in returned to the Y register 53 via the OR gate 110.

When the figure key [FIG] is actuated, the control signal $\overline{IB \rightarrow A}$ is developed from the control signal generator 50 to make conductive the AND gate 103. The selected digit number temporarily stored in the input buffer circuit (IB) 51 is introduced into a digit number buffer (A) 57 through the AND gate 103 and an OR gate 111. The actual digit number is counted by a digit counter (K) 59, of which contents are applied to the digit number buffer (A) 57 via an AND gate 119, which is made conductive by the control signal $\overline{K \rightarrow A}$, and the OR gate 111. An output data of the digit number buffer (A) 57 is applied to the other input termial of the comparator 56, and to one input terminal of the comparator 58. Moreover, the output data of the digit number buffer (A) 57 is applied to the digit adjust circuit 67.

The comparator 56 compares the digit number of the contents stored in the Y register 53 with the output data derived from the digit number buffer (A) 57 for developing the detection output when the digit number of the contents stored in the Y register 53 is greater than the output data of the digit number buffer (A) 57, and the output data of the digit number buffer (A) is not zero. The thus obtained detection output is applied to the control signal generator 50. The contents stored in the digit counter (K) 59 are increased by one by the control signal $\overline{K+1}$ upon every actuation of the numeral keys for introducing the initial number. When the hyphen information is introduced through the use of the minus key [−], the control signal $\overline{K+1}$ is developed when the numeral data following the hyphen symbol is transferred from the input buffer circuit (IB) 51 to the Y register 53, whereby the digit counter (K) 59 stores the digit number following the hyphen symbol. The contents stored in the digit counter (K) 59 are applied not only to the digit number buffer (A) 57 via the AND gate 119 but also to the other input terminal of the comparator 58. The contents stored in the digit counter (K) 59 are reset by the control signal $\overline{K\ Reset}$. When the contents stored in the digit number buffer (A) 57 and the digit counter (K) 59 become identical with each other, the comparator 58 develops the detection output toward the control signal generator 50. When the introduced numeral information includes the hyphen symbol, the control signal $\overline{IB \rightarrow E}$ is developed to make conductive the AND gate 107, whereby the fixed data preceding the hyphen symbol is introduced from the input buffer circuit (IB) 51 to a fixed number buffer (E) 60. An output data of the fixed number buffer (E) 60 is applied to a data detection circuit 61 and to one input terminal of and AND gate 120. The AND gate 120 is made conductive by the control signal $\overline{Y \rightarrow D.P}$, whereby the fixed number data is transferred to the upper digit of a display buffer (DB) 64 and a print buffer (PB) 65 through OR gats 132 and 133, respectively. The contents stored in the fixed number buffer (E) 60 are reset by the control signal $\overline{E\ Reset}$.

The number of times of printing preset by the count key [COUNT] is introduced into a times buffer (B) 62. When the count key [COUNT] is actuated, the control signal $\overline{IB \rightarrow B}$ is developed to make conductive the AND gate 104, thereby transferring the data temporarily stored in the input buffer circuit (IB) 51 to the times buffer (B) 62 through the AND gate 104 and an OR gate 112. The times buffer (B) 62 is initially set to "one" upon throwing of the power supply through the use of the control signal $\overline{P_{ON}}$ applied to the AND gate 108. An output data of the times buffer (B) 62 is applied to a print time counter (C) 63 through an AND gate 113 which is made conductive by the control signal $\overline{B \rightarrow C}$. The contents stored in the print time counter (C) 63 are reduced by one upon every completion of the printing operation in response to the control signal $\overline{C-1}$. An output data of the print time counter (C) 63 is applied to the detection circuit 80 which develops the detection output toward the control signal generator 50 when the contents stored in the print time counter (C) 63 become zero or when the borrow occurs in the print time counter (C) 63. Further, the output data of the print time counter (C) 63 is applied to an AND gate 121. The AND gate 121 is made conductive by the control signal $\overline{C \rightarrow D_n}$ to introduce the print times information into a times display buffer $(D_n)$ 69 for displaying the number of times of printing on a display unit 66 (digital display unit 6 in FIG. 1).

The nonvolatile memory 45 comprises a memory (x) 70, a memory (y) 71, a memory (a) 72 and a memory (b) 73. The memory (x) 70 corresponds to the X register 52, the memory (y) 71 corresponds to the Y register 53, the memory (a) 72 corresponds to the digit number buffer (A) 57, and the memory (b) 73 corresponds to the times buffer (B) 62. When the main power supply is terminated, the control signal $\overline{off}$ is developed from the control signal generator 50 to make conductive AND gates 123, 124, 125 and 126 to introduce the respective data into the memories 70, 71, 72 and 73. When the memory recall key [MR] is actuated, the control signal $\overline{MR}$ is developed from the control signal generator 50. In response to the control signal $\overline{MR}$, AND gates 127, 128, 129 and 130 are made conductive to transfer the data stored in the memories 70, 71, 72 and 73 to the corresponding registers 52 and 53, and the buffers 57 and 62.

As already discussed above, the numbering data stored in the Y register 53 is introduced into the digit adjust circuit 67 through the AND gate 122 and the OR gate 131. The digit adjust circuit 67 also receives the numeral information temporarily stored in the input buffer circuit (IB) 51 via the AND gate 106 and the OR gate 131 in response to the control signal $\overline{IB \rightarrow DB}$ which is developed when the numeral key is actuated.

The thus introduced numeral data is adjusted in the digit number in accordance with the preselected digit number stored in the digit number buffer (A) 57. The output data of the digit adjust circuit 67 is applied to the display buffer (DB) 64 for activating the display unit 66, and to the print buffer (PB) 65 for activating a printer 68 (shown in FIG. 3). The control signal P is applied to the printer 68 for conducting the type selection operation.

Figure 10:
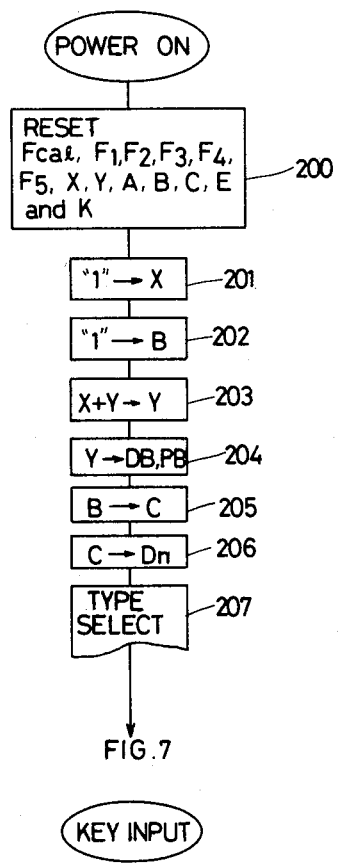

When the main power supply is thrown, the system operates in accordance with the program shown in FIG. 10. First, the flip-flops ($F_{cal}$) 48, ($F_1$) 74, ($F_2$) 75, ($F_3$) 76, ($F_4$) 77, and ($F_5$) 78, registers (X) 52, (Y) 53, buffers (A) 57, (B) 62, (E) 60, and counters (K) 59 and (C) 63 are reset at a step 200. The control signal $P_{ON}$ is developed from the control signal generator 50 to conduct a step 201 ("1"→X) and a step 202 ("1"→B) to introduce the numeral "1" into the X register 52 and the times buffer (B) 62. At a step 203, the control signal X+Y is developed. At this moment the sign memory 79 is in the reset state and, therefore, the AND gates 116 and 118 are made conductive to activate the adder 54. Since the Y register 53 stores "zero" at the initial state, the addition result "1" is introduced into the Y register 53 through the OR gate 110. The control signal Y→D.P is developed at a step 204 to make conductive the AND gate 122. Thus, the addition result "1" is supplied to the display buffer (DB) 64 and the print buffer (PB) 65. The information "1" is displayed on the display unit 66. The control signal B→C is developed at a step 205 to make conductive the AND gate 113, thereby introducing the information "1" into the print time counter (C) 63. The control signal C→$D_n$ is developed at a step 206 to make conductive the AND gate 121, whereby the information "1" is introduced into the times display buffer ($D_n$) 69 for displaying the information "1" on the display unit 66. The control signal P is developed at a step 207 to perform the type selection operation in accordance with the print data "1" stored in the print buffer (PB) 65. By this initial set operation, the display unit 66 displays the number of times of printing "1" and the present numbering data "1", and the printer unit 68 is placed to print the numbering data "1".

Figure 7A:
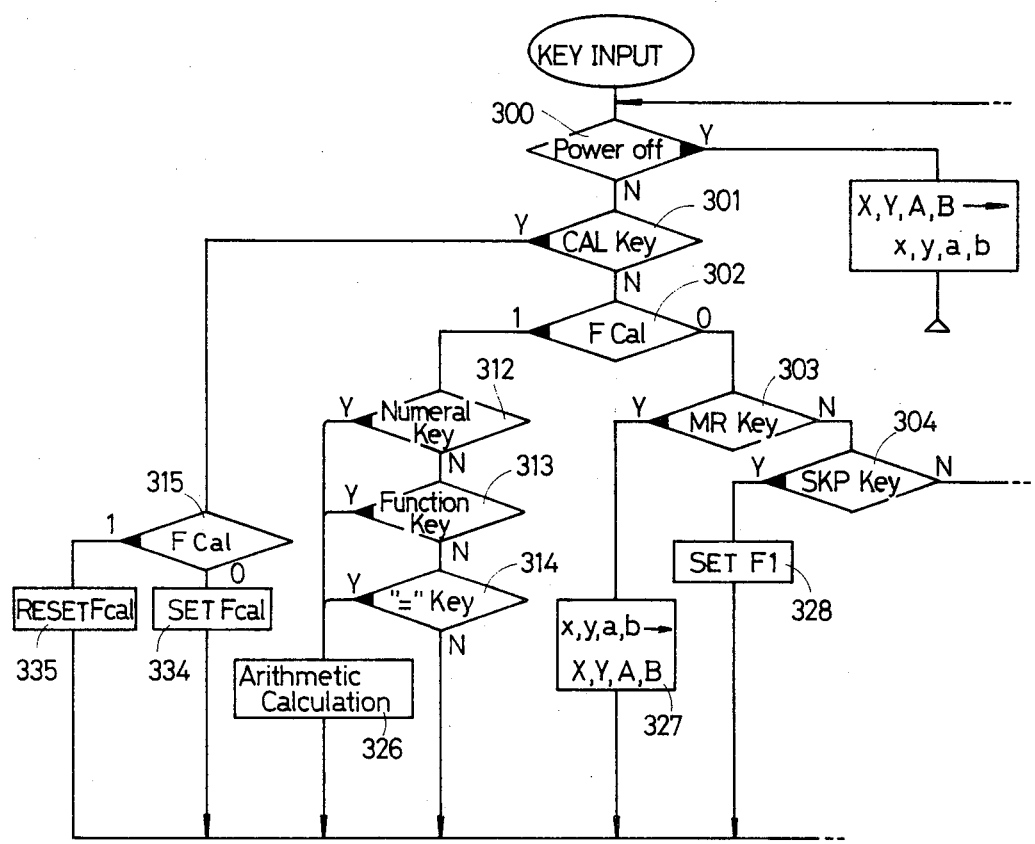
Figure 7:
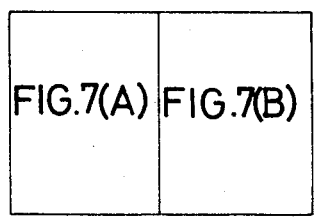
Figure 7:
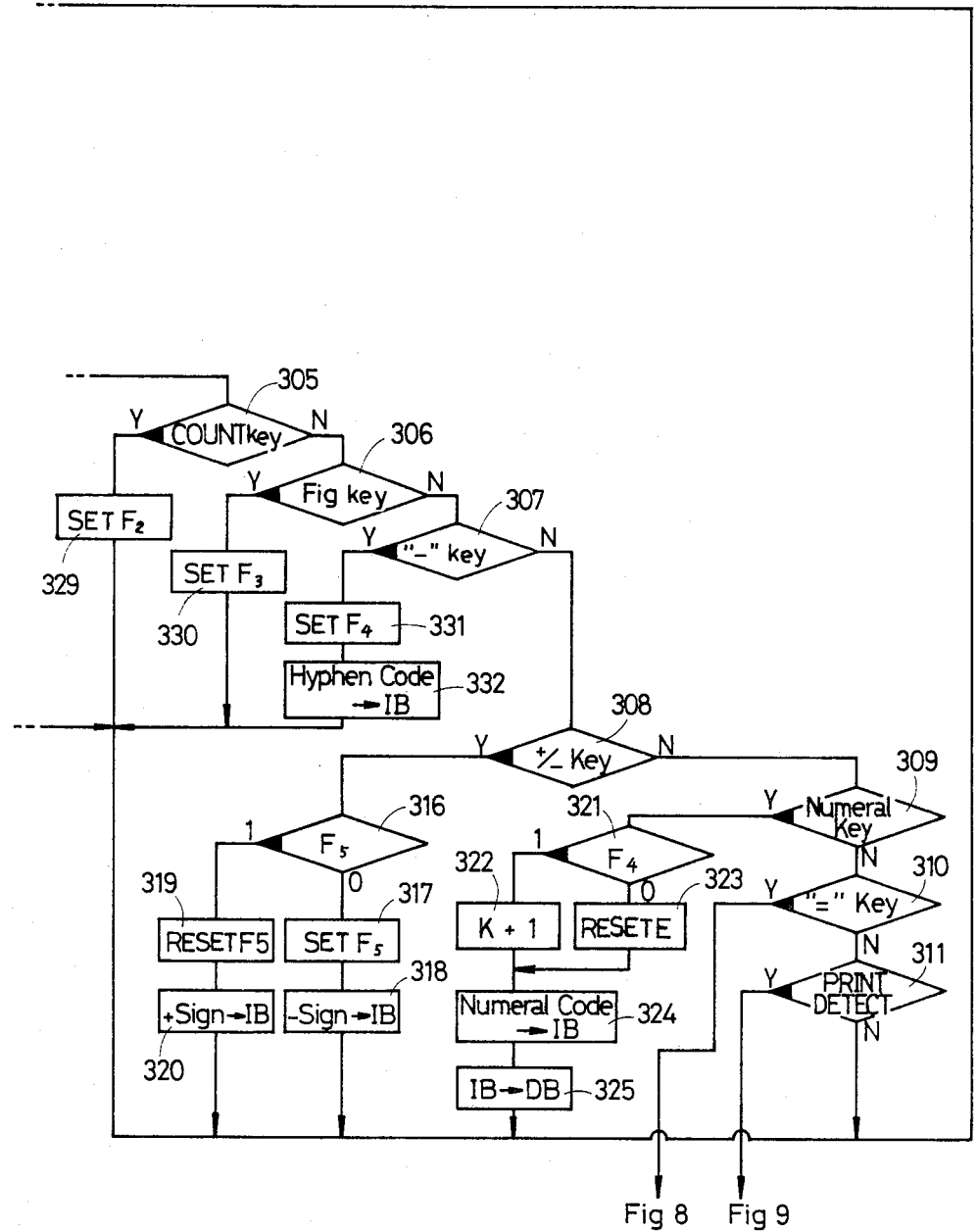

When the above-mentioned initial set operation is completed, the program is advanced to the key input shown in FIG. 7. When the mode selection key CAL is actuated, the program is advanced from a step 301 to a step 315 to set the flip-flop ($F_{cal}$) 48. Steps 300, 301, 302, 312, 313, 314 and 326 are placed in the standby condition to perform the calculator operation. Under these conditions, when the mode selection key CAL is again actuated, the program is advanced from the step 301 to the step 315 and a step 335. Thus, the flip-flop ($F_{cal}$) 48 is reset to place the system in the numbering mode.

The numbering mode is controlled in the following manner. When the printing operation is conducted in the above-mentioned initial set condition, the microswitch 35 is closed and the program is advanced from a step 311 to a program shown in FIG. 9. The control signal C−1 is developed at a step 500 to reduce the contents stored in the print time counter (C) 63 by "one". That is, the print time counter (C) 63 becomes zero and, therefore, the detection signal is developed from the detection circuit 80 at a step 501. The program is advanced to a step 503 to develop the control signal X+Y. Therefore, the information "2" is introduced into the Y register 53. The comparator 56 is enabled at a step 504, and the program is advanced to a step 505 because the digit number buffer (A) 57 is reset in the initial state. The following steps 505, 506, 507 and 508 are the same operations as the steps 204, 205, 206 and 207 shown in FIG. 10, respectively. Then, the program is returned to the key input determination shown in FIG. 7. In this way, the numbering operation is performed to sequentially print out the information 1, 2, 3, 4, . . . .

When the preset initial data is introduced, the program is advanced from a step 309 (FIG. 7) to a step 321. Since the flip-flop ($F_4$) 77 is held in the reset state in the initial condition, the program is advanced to a step 323 to develop the control signal E Reset. At a step 324, the preset numeral data is introduced into the input buffer circuit (IB) 51, and the control signal IB→DB is developed at a step 325. Thus, the AND gate 106 is made conductive to introduce the preset numeral data into the display buffer (DB) 64 through the AND gate 106, the OR gate 131, the digit adjust circuit 67 and the OR gate 132. The above-mentioned operation is repeated in response to the actuation of the numeral keys. After completion of the introduction of the preset numeral data, the equal key = is actuated.

Figure 8:
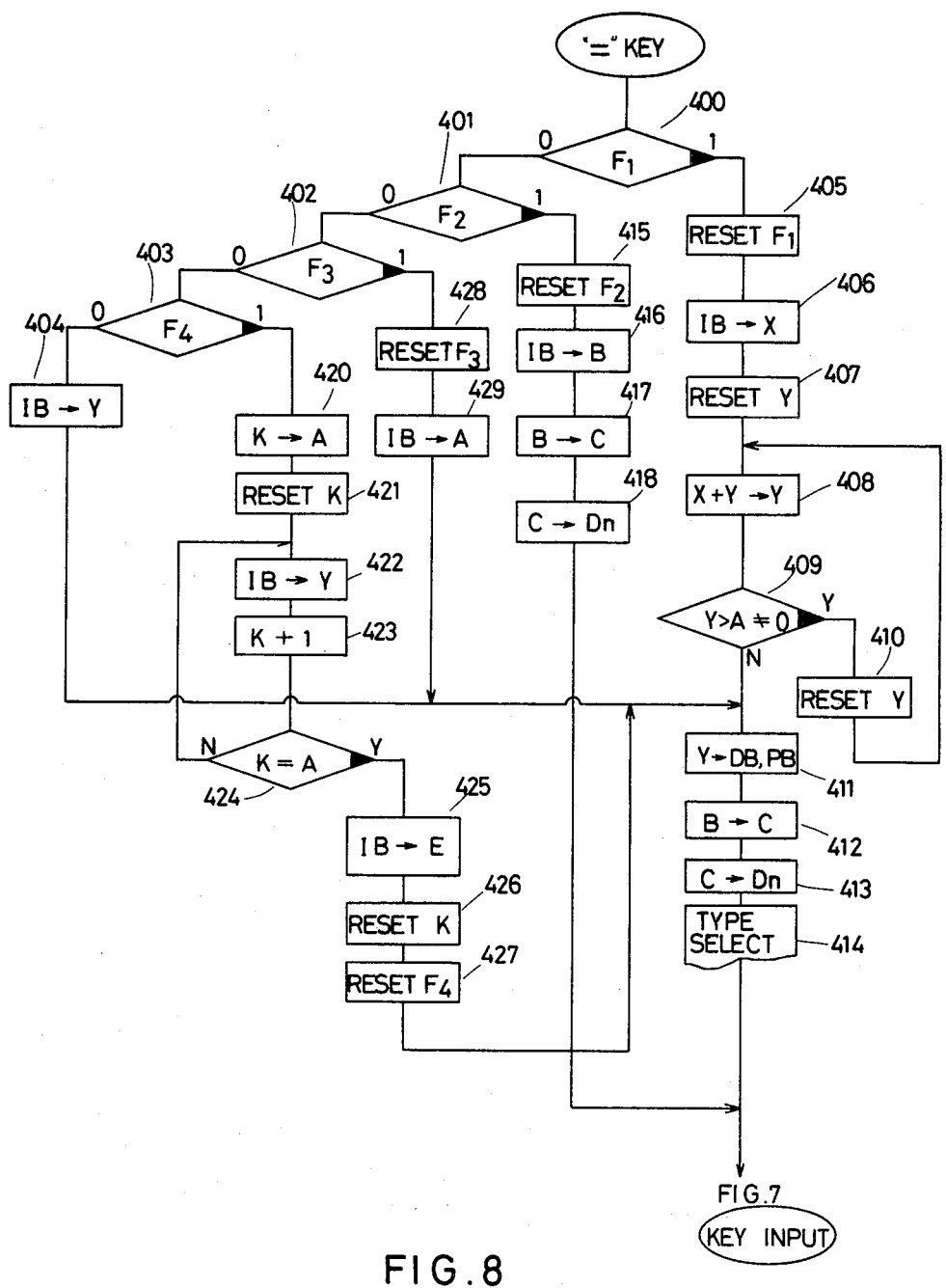

When the equal key = is actuated, the program is advanced from a step 310 to a program shown in FIG. 8. Since the flip-flops ($F_1$) 74, ($F_2$) 75, ($F_3$) 76 and ($F_4$) 77 are in the reset states, the program is advanced to a step 404 through steps 400, 401, 402 and 403. The control signal IB→Y is developed to make conductive the AND gate 102. Thus, the preset numeral data is supplied from the input buffer circuit (IB) 51 to the Y register 53 via the AND gate 102 and the OR gate 110. Then, the program is advanced to a step 411. Steps 411, 412, 413 and 414 are the same operations as the steps 204, 205, 206 and 207 shown in FIG. 10. Under these conditions, when the printing operation is performed, the program is advanced to the flow shown in FIG. 9. When, for example, the preset numeral data is "1000", the numbering operation is started from "1000" in the following manner.

1000, 1001, 1002, 1003, . . . .

When the skip key SKP is actuated, the program is advanced from a step 304 to a step 328. The control signal $F_1$ set is developed to set the flip-flop ($F_1$) 74. Then, the numeral keys are actuated to introduce the skip number information. The program is advanced to the steps 309, 321, 323, 324 and 325 to introduce the skip number information into the input buffer circuit (IB) 51. Thereafter, the equal key = is actuated to advance the program to the flow shown in FIG. 8. In this case the program is advanced from the step 400 to a step 405 because the flip-flop ($F_1$) 74 is held in the set state. The control signal $F_1$ Reset is developed at the step 405 to reset the flip-flop ($F_1$) 74. The skip number information temporarily stored in the input buffer circuit (IB) 51 is applied to the X register 52 at a step 406 because the AND gate 101 is made conductive by the control signal IB→X. At the following step 407, the control signal Y Reset is developed to reset the Y register 53. Then, the program is advanced to steps 408, 409, 411, 412, 413 and 414. The steps 408, 409, 411, 412, 413 and 414 perform the same operations as the steps 503, 504, 505, 506, 507 and 508 shown in FIG. 9. When, for example, the skip number "2" is introduced into the X register 52 from the keyboard panel 5 (FIG. 1), the Y register 53 also stores the initial number "2". Accordingly, the numbering operation is conducted in the following manner.

2, 4, 6, 8, 10, . . . .

If the skip number set is combined with the above-mentioned initial number preset feature, the numbering operation is performed in, for example, the following manner.

1000, 1002, 1004, 1006 . . . .

Moreover, when the skip number "0" is stored in the X register 52 and a desired number is introduced into the Y register 53, the desired number can be printed out repeatedly. Further, when the sign selection key $\boxed{+/-}$ is actuated at a time when the skip number is preset, the program is advanced from a step 308 to a step 316. Since the flip-flop (F$_5$) 78 is in the reset state, the program is advanced to a step 317 to develop the control signal $\boxed{F_5 \text{ Set}}$, and the $\boxed{\text{"}-\text{"}}$ sign is introduced into the sign bit S of the input buffer circuit (IB) 51 at a step 318. Under these conditions, when the skip number is introduced from the keyboard panel 5, the program is advanced to the flow shown in FIG. 8. At a step 406, the sign memory 79 is set because the "−" sign bit is contained in the skip number temporarily stored in the input buffer circuit (IB) 51. When the control signal $\boxed{X+Y}$ is developed at the step 408, the AND gates 115 and 117 are made conductive to activate the subtractor 55. When, for example, the skip number "−2" and the initial preset number "1000" is introduced into the system, the numbering operation is conducted in the following manner.

1000, 998, 996, 994, . . . .

Under these conditions, when the sign selection key $\boxed{+/-}$ is again actuated, the program is advanced from te step 308 to the step 316 and to steps 319 and 320 to remove the "−" sign contained in the skip number.

When the count key $\boxed{\text{COUNT}}$ is actuated, the program is advanced from a step 305 to a step 329 to set the flip-flop (F$_2$) 75. Then, the print times information, relating to the number of times an item of data is to be printed, is introduced through the numeral keys, and the program is advanced to the steps 309, 321 through 325. The program is further advanced to the flow shown in FIG. 8 when the equal key $\boxed{=}$ is actuated. Since the flip-flop (F$_2$) 75 is in the set state, the program is advanced from the step 401 to a step 415. The control signal $\boxed{F_2 \text{ Reset}}$ is developed to reset the flip-flop (F$_2$) 75. Then, the control signal $\boxed{IB \rightarrow B}$ is developed at a step 416 to introduce the print times information into the print times buffer (B) 62 through the AND gate 104 and the OR gate 112. The control signal $\boxed{B \rightarrow C}$ is developed at a step 417 to memorize the print times information in the print time counter (C) 63 via the AND gate 113. The control signal $\boxed{C \rightarrow D_n}$ is developed at a step 418 to introduce the print times information into the times display buffer (D$_n$) 69 via the AND gate 121.

Figure 9:
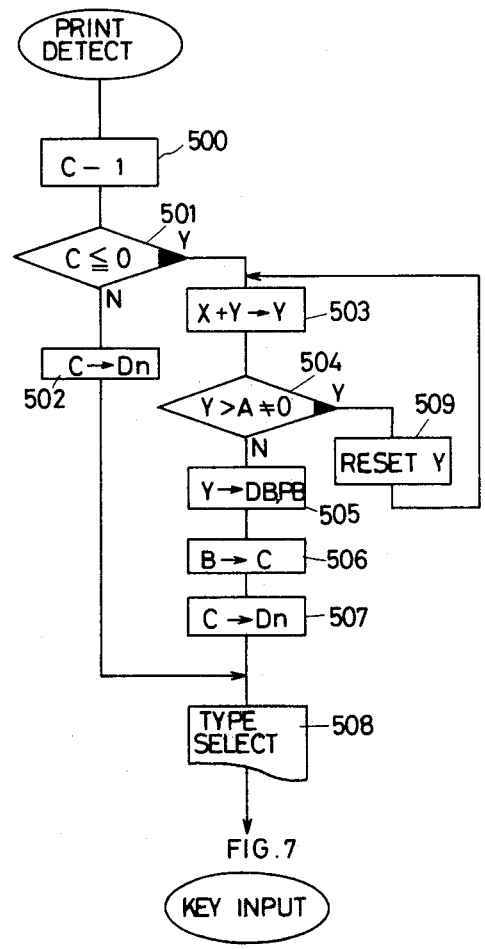

Under these conditions, when the actual printing operation is performed, the program is advanced to the step 500 shown in FIG. 9. The control signal $\boxed{C-1}$ is developed to reduce the contents stored in the print time counter (C) 63 by "one". At the step 501 the contents stored in the print time counter (C) 63 is checked. When the contents stored in the print time counter (C) 63 are "zero" or the borrow appears in the print time counter (C) 63, the detection circuit 80 develops the detection signal. When the contents stored in the print time counter (C) 63 are greater than "zero", the program is advanced to a step 502 to display the reduced number. Then, the program is advanced to the step 508 to prepare the next printing operation. Therefore, the next printed number is the same as previously printed number. The operation is repeated till the detection circuit 80 develops the detection signal at the step 501. When the detection signal is developed from the detection circuit 80, the program is advanced to the steps 503 through 508. When, for examples, the print times number "2" is preset, the numbering operation is performed in the following manner.

1, 1, 2, 2, 3, 3, . . . .

When the figure key $\boxed{\text{FIG}}$ is actuated, the program is advanced from a step 306 to a step 330. The control signal $\boxed{F_3 \text{Set}}$ is developed to set the flip-flop (F$_3$) 76. A desired digit number is introduced from the keyboard panel 5 into the input buffer circuit (IB) 51. Thereafter, the equal key $\boxed{=}$ is actuated to activate the operation shown in FIG. 8. The program is advanced from the step 402 to a step 428 to reset the flip-flop (F$_3$) 76. The control signal $\boxed{IB \rightarrow A}$ is developed at a step 429 to introduce the desired digit number into the digit number buffer (A) 57 via the AND gate 103 and the OR gate 111. Then, the program is advanced to the steps 411 through 414. At the step 411, the print data stored in the Y register 53 is supplied to the digit adjust circuit 67, wherein the zero-suppress operation is performed against the digits exceeding the desired digit number stored in the digit number buffer (A) 57. The comparator 56 determines whether Y>A at the step 409, and develops the detection output to reset the Y register 53 (step 410) when the digit number of the print data stored in the Y register 53 exceeds the desired digit number stored in the digit number buffer (A) 57. When the minus key $\boxed{-}$ is actuated to introduce the hyphen symbol, the program is advanced from a step 307 to a step 331. Now assume that the numeral keys and the minus key — are actuated in the following order.

$\boxed{5}, \boxed{4}, \boxed{-}, \boxed{0}, \boxed{0}, \boxed{0}, \boxed{1}$

The fixed number data "54" is first introduced into the input buffer circuit (IB) 51 in accordance with the program steps 309, 321, 323, 324 and 325. Thereafter, when the minus key $\boxed{-}$ is actuated, the control signal $\boxed{F_4 \text{Set}}$ is developed at the step 331 to set the flip-flop (F$_4$) 77. The hyphen code is introduced into the input buffer circuit (IB) 51 at a step 332, and the system is prepared to receive the initial preset data.

Since the flip-flop (F$_4$) 77 is in the set state, the program is advanced from the step 321 to a step 332 to develop the control signal $\boxed{K+1}$. The contents stored in the digit counter (K) 59 are increased by one upon every actuation of the numeral keys. In this example, the digit counter (K) 59 stores "4". Thereafter, the equal key $\boxed{=}$ is actuated to advance the program to the flow shown in FIG. 8. Since the flip-flop (F$_4$) 77 is in the set state, the program is advanced from the step 403 to a step 420 to develop the control signal $\boxed{K \rightarrow A}$. The numeral information "4" is transferred from the digit counter (K) 59 to the digit number buffer (A) 57 through the AND gate 119 and the OR gate 111. The control signal (K Reset) is developed at a step 421 to reset the digit counter (K) 59. The control signal (IB→Y) is developed at a step 422 to introduce the lowest digit "1" of the data stored in the input buffer circuit (IB) 51 into the Y register 53 via the AND gate 102 and the OR gate 110. The control signal (K+1) is developed at a step 423 to increase the contents stored in the digit counter (K) 59 by "one". The comparator 58 is enabled at a step 424 to compare the contents "1" stored in the digit counter (K) 59 with the contents "4" stored in the digit number buffer (A) 57. Then, the program is returned to the step 422 to repeat the above-mentioned operation till the information "0001" is introduced into the Y register 53.

When the information "0001" is introduced into the Y register 53, the program is advanced from the step 424 to a step 425 to introduce the fixed data "54-" into the fixed number buffer (E) 60 via the AND gate 107. The digit counter (K) 59 is reset at a step 426, and the flip-flop (F4) 77 is reset at a step 427. Then, the program is advanced to the step 411, 412, 413 and 414 to prepare the numbering of "54-0001" via the AND gate 122 and the AND gate 120 which is made conductive by the detection circuit 61. When the actual printing operation is conducted, the program is advanced to the flow shown in FIG. 9 to perform the numbering operation in the following manner.

54-0001, 54-0002, 54-0003, ....

When the data digit exceeds the preset number "4" stored in the digit number buffer (A) 57, the Y register 53 is reset at the step 509. Accordingly, the numbering operation is performed in the following manner. ..., 54-9998, 54-9999, 54-0001, 54-0001, .... Under these conditions, when the numeral keys are actuated, the fixed number buffer (E) is reset at the step 323.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A numbering machine for printing a desired sequence of numbers on a plurality of items comprising:
   a digital control system including key input means including numeral keys and function keys;
   a control signal generator for developing control signals in response to actuation of said function keys;
   a print data memory for storing print data in accordance with said control signals developed by said control signal generator;
   a printer unit for printing a sequence of numbers on a plurality of items;
   transfer means for transferring said print data stored in said print data memory to said printer unit;
   print completion detection means for developing a print completion signal upon completion of each printing operation performed by said printer unit; and
   calculation means for varying said print data stored in said print data memory and transferred to said printer unit by a preselected skip number in response to said print completion signal.

2. The numbering machine of claim 1, further comprising a digital display unit for displaying said print data stored in said print data memory.

3. The numbering machine of claim 1, wherein said calculation means comprises an adder for increasing said print data stored in said print data memory by said preselected skip number in response to said print completion signal.

4. The numbering machine of claim 3, wherein said calculation means further comprises a subtractor for decreasing said print data stored in said print data memory by said preselected skip number in response to said print completion signal.

5. The numbering machine of claim 4, wherein said function keys include a sign key for selectively activating said adder or said subtractor.

6. The numbering machine of claim 5, further comprising:
   initial setting means for activating said adder.

7. The numbering machine of claim 6, wherein said initial setting means resets the print data stored in said print data memory.

8. The numbering machine of claim 6, wherein said initial setting means presents said preselected skip number at "one".

9. The numbering machine of any one of claims 1-8, further comprising initial print data preset means for introducing desired initial print data into said print data memory, whereby the numbering operation is started from said desired initial print data.

10. The numbering machine of claim 9, wherein said desired initial print data is introduced through said numeral keys, said function keys comprising an equal key for enabling said initial print data preset means.

11. The numbering machine of any one of claims 1-8, further comprising print times control means for controlling the number of times the same print data will be printed by said printing means.

12. The numbering machine of claim 11, said print times control means comprising:
   a print times memory for storing said number of times, the desired number of times being introduced through said numeral keys;
   a print time counter for counting the number of actual printing operations performed for the same print data;
   a comparator for comparing said number of times stored in said print times memory with said number of actual printing operations counted by said print time counter; and
   detection means for developing a control signal for activating said calculation means when said comparator determines that said number of actual printing operations is identical with said number of times.

13. The numbering machine of claim 12, wherein said print times control means further comprises an initial print time setting means for initially introducing a data "one" into said print times memory.

14. The numbering machine of any one of claims 1-8, wherein said print data memory includes a first print data memory for storing fixed print data, and a second print data memory for storing print data which is varied by said calculation means.

15. The numbering machine of claim 14, wherein said transfer means comprises means for combining said fixed print data stored in said first print data memory and said print data stored in said second print data memory with an intervening hyphen symbol.

* * * * *